United States Patent [19]

Trew

[11] Patent Number: 5,696,847
[45] Date of Patent: Dec. 9, 1997

[54] METHOD AND APPARATUS FOR PROCESSING A SIGNAL

[75] Inventor: Timothy I.P. Trew, Horley, England

[73] Assignee: U.S. Philips Corporation, New York, N.Y.

[21] Appl. No.: 434,839

[22] Filed: Jun. 15, 1993

Related U.S. Application Data

[63] Continuation of Ser. No. 672,714, Mar. 18, 1991, abandoned.

[30] Foreign Application Priority Data

Mar. 21, 1990 [GB] United Kingdom ............ 9006325
Jan. 28, 1991 [GB] United Kingdom ............ 9101771

[51] Int. Cl.$^6$ ............................................. G06K 9/40
[52] U.S. Cl. .................................. 382/254; 382/264
[58] Field of Search ............................ 382/254, 260, 382/261, 262, 264, 265, 270, 273, 300; 348/426, 400, 401, 409, 458; 364/724.13, 769, 715.01

[56] References Cited

U.S. PATENT DOCUMENTS

| | | | |
|---|---|---|---|
| 4,858,026 | 8/1989 | Richards | 358/13 |
| 4,868,654 | 9/1989 | Juri et al. | 358/13 |
| 4,896,212 | 1/1990 | Chantelou | 358/138 |
| 4,933,766 | 6/1990 | de Hadn et al. | 358/138 |
| 4,965,667 | 10/1990 | Trew et al. | 348/425 |
| 5,023,919 | 6/1991 | Wataya | 382/264 |

OTHER PUBLICATIONS

"HD-MAC Coding of High Definition Television" by F.W.P. Vreeswijk, Contribution to the Blub de Rennes Young Researcher's Seminar, M.I.T. Cambridge, Mass., U.S.A., 9–13 Oct. 1988.

"HDMAC Coding for Mac Compatible Broadcasting of HDTV Signals" by M.R. Haghiri and T.W.P. Vreeswijk, IEEE Transactions on Broadcasting, vol. 36 No. 4, Dec. 1990.

Foreign Patent Office Office Action.

*Primary Examiner*—Leo Boudreau
*Assistant Examiner*—Phuoc Tran
*Attorney, Agent, or Firm*—Michael E. Belk

[57] ABSTRACT

A method and apparatus for processing an applied signal. The applied signal is low pass filtered via a low pass filter having an input and an output, wherein the filter input and output are coupled to respective inputs of a selection device and respective inputs of a comparator. The comparator compares each of its inputs to one another and produces an output indicating which of its inputs has a lower amplitude. The comparator output is applied to a control input of the selection device such that the selection device will output the signal with the lower amplitude, either the applied signal or the low pass filtered signal.

12 Claims, 2 Drawing Sheets a b c

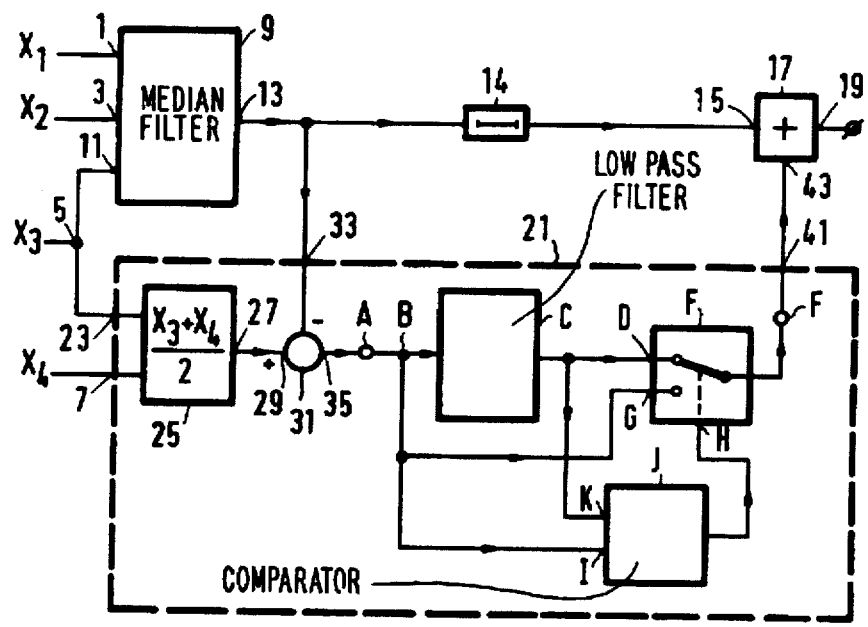
FIG.3
FIG.4
FIG.5
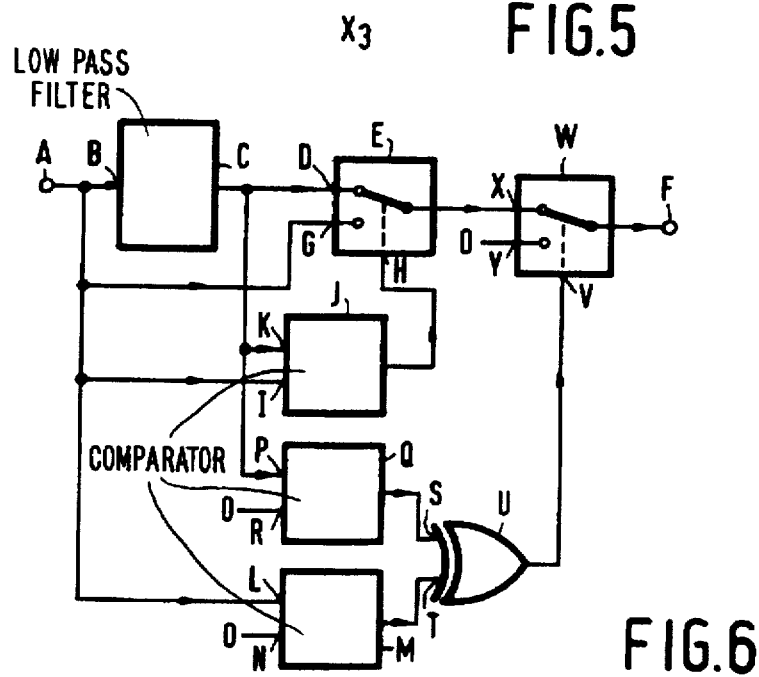
FIG.6

METHOD AND APPARATUS FOR PROCESSING A SIGNAL

This is a continuation of application Ser. No. 07/672,714, filed Mar. 18, 1991, abandoned.

BACKGROUND OF THE INVENTION

The present invention relates to a method of processing an applied signal in which the applied signal is low pass filtered to produce a filtered signal. The invention also relates to apparatus using the above method.

Apparatus using the above method is described in European Patent Application EP-A-0344854 (U.S. Pat. No. 4,933,766 is a U.S. equivalent thereof) and comprises a low pass filter incorporated in a correction circuit of an interpolation filter. As will be described in relation to the embodiments of the present invention the use of such a correction circuit in the production of a correction signal can produce irregularities in a display signal and can cause problems in other applications.

It is an object of the invention to provide a method and apparatus capable of at least mitigating such problems.

SUMMARY OF THE INVENTION

The present invention provides a method of processing an applied signal in which the applied signal is low pass filtered to produce a filtered signal. The method of the present invention is characterized in that said method additionally comprises the steps of:

i) comparing the applied signal with the filtered signal according to a given criterion, and ii) selecting as an output signal the applied signal or the filtered signal according to whether or not the criterion is met.

The method according to the invention has the advantage that where the use of the filtered signal could cause a problem, it can be replaced by the applied signal, i.e., the signal prior to filtering.

The given criterion may be the relative absolute values of the differences between the applied and filtered signals end a reference signal, and the signal selected as the output may be the one having the lowest absolute value. The signs of the differences may be compared and the output signal replaced by a reference level at times when the signs differ.

The invention also provides a method of interpolating a picture signal sampled in accordance with a sampling pattern which is shifted from line to line, comprising the steps of:

i) identifying a group of four picture elements of the picture signal located around a picture element to be interpolated, ii) subjecting three of the group of picture elements to median filtering, iii) producing a correction signal by:

a. averaging the remaining one of the group of picture elements with that picture element of the group located diametrically with the picture element to be interpolated, b. combining the median filtered picture elements and the averaged picture elements, and c. processing the combined picture elements, and, iv) combining the median filtered picture elements and the correction signal to produce an interpolated signal, characterized in that the processing of the combined picture elements is in accordance with the above method.

Additionally, the invention provides apparatus for processing an applied signal comprising a filter input for receiving said applied signal, a filter input for subjecting the applied signal, to low pass filtering, and a filter output for deriving a filtered signal from the filter, wherein the apparatus additionally comprises a comparator for comparing the applied signal and the filtered signal according to a given criterion, and a selector device for selecting as an output signal, either the applied signal or the filtered signal according to whether or not the criterion is met.

The comparator compares the relative absolute values of the differences between the applied signal and the filtered signal and a reference signal while the selector device may select, under the control of the comparator, the signal having the lowest absolute value. A second comparator may be provided for Comparing the signs of the the differences, and a second selector device may be provided for selecting the reference level instead of the output signal under the control of the second comparator when the signs differ.

The invention further comprises an interpolation filter for a picture signal sampled in accordance with a sampling pattern which is shifted from line to line, the interpolation filter comprising inputs for identifying a group of four elements of the picture signal located around a picture element to be interpolated, a median filter having three inputs for receiving three of the group of picture elements, a correction circuit comprising an averaging circuit having two inputs for receiving the remaining one of the group of picture elements with that picture element of the group located diametrically with the picture element to be interpolated, a first combining circuit for combining the output of the averaging circuit with the output of the median filter and a processing apparatus for processing the combined outputs to produce a correction signal, and a second combining circuit for combining the output of the median filter and the correction signal to produce an interpolated signal, wherein the processing apparatus comprises the above apparatus.

BRIEF DESCRIPTION OF THE DRAWINGS

The above and other features of the invention will be described, by way of example, with reference to the accompanying drawings, in which:

FIG. 3 is a block diagram of an interpolation filter incorporating the apparatus of FIG. 1, FIGS. 4 and 5 show diagrammatical arrangements of picture elements in a picture signal applied to the interpolation filter of FIG. 3, and FIG. 6 is a modification of the block diagram shown in FIG. 1.

DETAILED DESCRIPTION OF PREFERRED EMBODIMENT OF THE INVENTION

Figure 1:
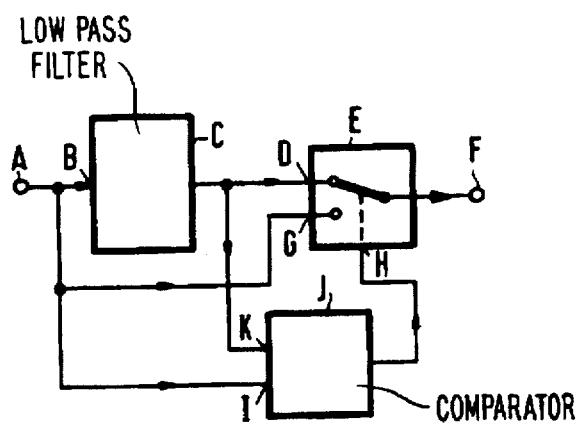
FIG. 1 is a block diagram of an apparatus according to the invention.

FIG. 1 shows a filter arrangement having a signal input A which is connected to input terminal B of a low pass filter C. The actual construction of the low pass filter C is unimportant and will depend, among other things, on the nature of the applied signal, the filter being either analog or digital, linear or non-linear. The filtered output of the low pass filter C is applied to an input D of a selection device E, in the form of a changeover switch or a multiplexer, that input, in the figure, is connected by way of the selection device E output to an output terminal F of the filter arrangement.

The signal at input terminal A is also applied to a second input G of the switch or multiplexer E and will be directed to its output, when appropriate, under the control of a control signal at a control input H. In addition, the signal at input terminal A is applied to a first input I of a comparator J. Comparator J has a second input K which receives the filtered signal from the output of the a low pass filter C.

In operation, the unfiltered and filtered signals applied to inputs I and K, respectively have their amplitudes compared in comparator J to produce a control signal at its output indicating which of the two inputs has the lowest amplitude. This control signal is applied to control input H of the selection device E such that if the filtered signal at its input D has the lowest amplitude it is that signal which is conveyed to the output terminal F, while if the unfiltered signal at input G has the lowest amplitude then a connection is made between that input and the output of selection device E so that the unfiltered signal is conveyed to output terminal F.

One place in which such a filter arrangement may be used is in an interpolation filter for a picture signal sampled in accordance with a sampling pattern which is shifted from line to line. Interpolation filters of this type can be used in high definition television systems, such as, the HD-MAC system which is described in the paper "HD-MAC Coding of High Definition Television" by F. W. P. Vreeswijk, contribution to the Club de Rennes Young Researcher's Seminar, M.I.T. Cambridge, Mass., U.S.A., Oct. 9–13, 1988 and in European Patent Application EP-A-0322955 (U.S. Pat. No. 4,965,667 is an equivalent thereof).

The HD-MAC system is a bandwidth compression system which reduces the transmitted spatial information by diagonal filtering, followed by quince sub-sampling. The system has three branches with different spatial frequency capacities, transmitting the information over different periods so that the overall data rate is constant. The picture is divided into uniform tesselating blocks, and the information for each block is transmitted at the lowest temporal rate, 20 ms, 40 ms or 80 ms, which gives adequate portrayal of the motion within the block. Motion compensated temporal interpolation is used in a bandwidth restoration decoder to allow the 40 ms branch to be used for motion of up to ±6 pixels/40 ms.

Figure 2:
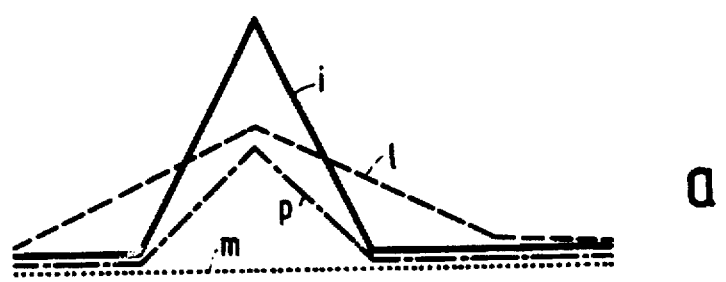
FIG. 2 shows the responses of various filter arrangements.
Figure 2:
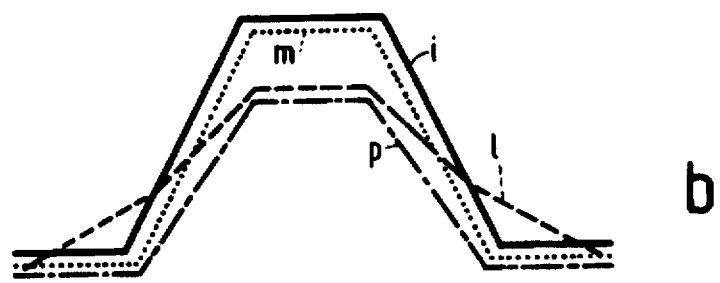
Figure 2:
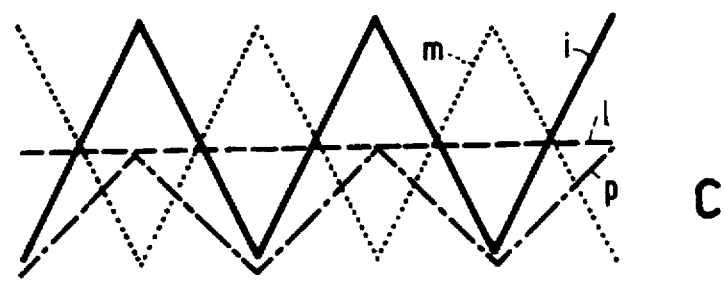

The decimation filter characteristics and sub-sampling patterns for the three branches are shown in FIGS. 5 and 6 of the Vreeswijk paper and FIGS. 2, 3 and 4 of EP-A-0322955. It should be noted that the three sub-sampling patterns all have the same structure, although they have different sampling densities. The non-linear spatial interpolators for the branches, therefore, have a similar structure. They each use a three point 2-D median filter, as the core of the filter which uses the middle, or most popular, of the three values as the estimate for the missing pixel. This is not sufficient for accurate interpolation, however, since it fails to interpolate missing pixels in a horizontal line against a contrasting background. For example, if the missing pixel forms part of a white horizontal line against a dark background, then the transmitted samples above and below the pixel to be interpolated will both be dark, so this value will be used incorrectly as its estimate.

This is overcome by adding a correction signal which is the difference between the output of the median filter and the average of its horizontally adjacent neighbors. Horizontal lines are reproduced correctly if this correction signal is added to the output of the median filter. This is not sufficient, however, since the correction signal will now degrade vertical lines, so the actual interpolators need to employ a low-pass filter to which the correction signal is applied before adding it to the median filter output.

Such an interpolation filter is described in the above mentioned European Patent Application EP-A-0344854, which gives a reasonable picture, but it is not perfect because the low-pass filter will not completely suppress the correction signal on vertical lines, introducing serrations. These serrations are exacerbated by the inverse vertical compatibility improvement filter employed in the system, and they spread up to three pixels on either side of the line. This result is representative of the 80 ms branch or the odd field of the 40 ms branch. The horizontal spacing of the transmitted sample is doubled for the 20 ms branch, in which case this interpolator is followed by a horizontal filter extending the serrations to ±6 pixels.

An earlier investigation examined the effect of replacing the three-tap linear low-pass filter for the correction signal with a median filter. This improved the performance on purely vertical lines by restricting the correction signal's spread, but it did not prove to be robust on real picture material and a more reliable filter was required.

The general behavior of three-tap linear and median filters to isolated spikes and repetitive high frequency waveforms is illustrated in FIGS. 2a–2c. FIG. 2a shows at m how a median filter will eliminate an isolated spike in an input waveform i, whereas at l a linear filter will reduce the spike's peak amplitude but spread its width. The fragility of the median filter is exemplified by FIG. 2b in which doubling the width of the spike of the input waveform i completely changes the median filtered m output. FIG. 2c shows an even more extreme case in which the median filter output m is out of phase with the input signal i and the linear filter output l remains constant. The linear filter, although less effective at eliminating isolated spikes, performs more satisfactorily on all types of signals. A technique was, therefore, sought which might improve filter performance over wide range of picture material, and it was found that such an improvement could be achieved if the filter used the principles that the filtered correction should never exceed its original value and, for bipolar signals, it should not change its sign. FIG. 2 additionally shows at the waveforms p how this modification improves the performance of the linear filter by preventing it from increasing the width of isolated spikes, while still attenuating their peaks.

An interpolation filter which meets the first principle of the filtered correction signal of never exceeding its original value is shown in FIG. 3, which is a modification of the interpolation filter shown in FIG. 1 of the above mentioned EP-A-0344854. In the accompanying FIG. 3, the filter arrangement of the accompanying FIG. 1 replaces the low pass filter 39 in the correction circuit 21 of FIG. 1 of EP-A-0344854 and corresponding reference symbols present in FIG. 1 of EP-A-0344854. The accompanying FIG. 1 and the accompanying FIG. 3 indicate like components.

The interpolation filter of FIG. 3 has four inputs 1, 3, 5 and 7 to which signals of four pixels $x_1$, $x_2$, $x_3$ and $x_4$, respectively, are applied. These four pixels $x_1$, $x_2$, $x_3$ and $x_4$ may be located with respect to one another and to a pixel to be interpolated in the way as is shown in FIG. 4 or in FIG. 5, in which a dot (.) denotes the pixel to be interpolated. The inputs 1 and 3 of the interpolation filter are also inputs of a median filter 9. The medium filter 9 also has a third input 11 which is connected to the input 5 of the interpolation filter. An output 13 of the median filter 9 is coupled via a delay element 14 to a first input 15 of a combining circuit 17 formed by an adder, an output 19 of which constitutes the output of the interpolation filter. The input 7 of the interpolation filter is also a first input of a correction circuit 21. A second input 23 of the correction circuit 21 is connected to the input 5 of the interpolation filter. The inputs 7 and 23 of the correction circuit 21 also constitute inputs of an averaging circuit 25. An output 27 of the averaging circuit 25 is connected to a positive input 29 of a subtractor circuit 31 whose negative input 33, which also constitutes a third input the correction circuit 21, is connected to the output 13 of the median filter 9. If the inputs 29 and 33 of the subtractor circuit 31 are interchanged, the combining circuit 17 must be formed by a further subtractor circuit, the first input 15 of which would be positive while the second input 43 would be negative. An output 35 of the subtractor circuit 31 is connected to the signal input A of the filter arrangement described in FIG. 1 above and the signal output F of that filter arrangement is connected to the output 41 of the correction circuit 21, which in turn is connected to a second input 43 of the combining circuit 17. The low-pass filter C of the filter arrangement in the direction of the connection line of the pixels $x_3$ and $x_4$ ensures that the correction circuit 21 is exclusively active for those frequencies at which the median filter 9 does not function correctly, but at which the averaging circuit does function correctly. The construction and operation of the low pass filter C of the filter arrangement may correspond to that of low pass filter 39 present in FIG. 1 of the above mentioned EP-A-0344854.

If the picture signal applied to the interpolation filter originates from a field composed of four received fields, the output signal of the interpolation filter can be applied substantially directly to a display device. If the picture signal applied to the interpolation filter originates from only one received field, an extra interpolation step is to be carried out. A very simple interpolator is preferably chosen for this purpose, for example, an interpolator determining the mean value of two pixels located side by side on the same line. Such a simple interpolator may be used because the spatial resolution is low anyway in moving pictures.

The interpolation filter so far described with relation to the accompanying FIG. 3 only meets the first of the above mentioned principles, namely that the filtered correction should never exceed its original value. The second mentioned principle that the filtered correction should never change its sign can be achieved by the use of a filter arrangement as shown in the accompanying FIG. 6, which is a modification of the accompanying FIG. 1 and where like reference symbols indicate like components.

In FIG. 6 the signal at input A is also applied to a first input L of a second comparator M, the second input N of which receives a reference level which in this case is zero. The filtered output from low pass filter C is also applied to a first input P of a third comparator Q, whose second input R also receives a reference level which is again zero. Comparators M and R, respectively, produce a "high" output if their first inputs L and P are positive with respect to the zero level at their second inputs, or a "low" output if their first inputs L and P are negative with respect to the zero level. These outputs are applied to respective inputs S and T of an exclusive OR (EX-OR) gate U, whose output is applied to the control input V of a second selection device W in the form of a changeover switch or multiplexer. A first input X of selection device W is connected to the output of the first selection device E, while its second input Y receive a reference level which is also zero. The filter arrangement output F is connected to the output of the second selection device W.

In operation, if the signals to the first inputs L and P of the second and third comparators M and Q are both of the same polarity, the inputs S and T to the EX-OR gate U will correspond (both "high" or both "low") and there will be no output from the EX-OR gate U for application to control input V. Whichever signal is then present at the output of the first selection device E will appear at the output F of the filter arrangement. If, however, the signals at the respective first inputs L and P of the second and third comparators M and Q differ in their polarities, the signals at the inputs S and T of the EX-OR gate U will differ (one "high" and one "low") and the gate U will produce an output for application to the control input V to change the operation of the second selection device W. In this case the zero reference level present at the second input Y appears at the output F of the filter arrangement.

Although in the filter arrangements described above the selection device E is arranged to convey the lowest amplitude signal, it will be appreciated that there might be applications in which the higher amplitude signal is the one that is to be conveyed to the filter arrangement output F. In addition, it will also be appreciated that the control of the selection devices E and/or W may be performed in ways other than that described and according to different criteria. For instance, when the mean value of the input signal at input A is expected to be non-zero this value can be used as the reference level against which the input and output of the low pass filter C are compared in FIG. 6. The selection criterion will then be based on the absolute values of differences between such reference level and the applied and filtered signals.

Although the arrangement of FIG. 1 is only shown applied to an interpolation filter as in FIG. 3, such an arrangement will have other applications. For example, in cases where the input signal may be expected to have a zero average level, such as, where the signal represents the difference between signals derived from a common source. The arrangement will then attenuate localized transients without introducing spurious responses elsewhere.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein, either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of processing a supplied signal to derive a correction signal therefrom, comprising the steps of:
   low pass filtering the supplied signal to produce a filtered signal;
   comparing the supplied signal with the filtered signal in accordance with a predetermined criterion to thereby select one of said signals as a selected signal;
   comparing the supplied signal with a reference level to derive a first logic signal, comparing the filtered signal with said reference level to derive a second logic signal, and combining the first and second logic signals to derive a third logic signal having a logic value indicative of whether the first and second logic signals have the same or different logic values; and depending on the logic value of said third logic signal, supplying either said selected signal or a signal at said reference level as said correction signal.

2. A method as claimed in claim 1, wherein said comparison of the supplied signal with the filtered signal compares the amplitudes thereof, and said predetermined criterion is to select the one of said signals of lower amplitude as the selected signal.

3. A method as claimed in claim 1, wherein said first logic signal is indicative of the sign of said supplied signal relative to said reference level, said second logic signal is indicative of the sign of the filtered signal relative to said reference level, and said third logic signal is indicative of whether the supplied signal and the filtered signal are of the same sign or differ in sign.

4. A method as claimed in claim 1, wherein said third logic signal has a first logic value when said first and second logic signals have the same logic values, said third logic signal has a second logic value when said first and second logic signals have different logic values, said selected signal is supplied as said correction signal when said third logic signal has said first logic value, and said reference level signal is supplied at said correction signal when said third logic signal has said second logic value.

5. An apparatus for processing a supplied signal to derive a correction signal therefrom, comprising:

means for subjected the supplied signal to low pass filtering to produce a filtered signal;

first selecting means for comparing the supplied signal with the filtered signal in accordance with a predetermined criterion to thereby select one of said signals as a selected signal;

comparing means for comparing the supplied signal with a reference level to derive a first logic signal, and for comparing the filtered signal with said reference level to derive a second logic signal;

combining means for combining the first and second logic signals to derive a third logic signal indicative of whether the first and second logic signals have the same or different logic values; and second selecting means controlled by said third logic signal in accordance with the logic value thereof to supply either said selected signal or a signal at said reference level as said correction signal.

6. Apparatus as claimed in claim 5, wherein said first selecting means compares the amplitudes of the supplied signal and the filtered signal, and said predetermined criterion is to select the one of said signals of lower amplitude as the selected signal.

7. Apparatus as claimed in claim 6, wherein said first logic signal is indicative of the sign of the supplied signal relative to said reference level, said second logic signal is indicative of the sign of the filtered signal relative to said reference level, and said third logic signal is indicative of whether the supplied signal and the filtered signal are of the same sign or differ in sign.

8. A method of interpolating a picture signal sampled in accordance with a sampling pattern which is shifted from line to line, said picture signal having picture elements, the method comprising the steps of:

a. identifying a group of four picture elements of said picture signal located around a picture element to be interpolated;

b. subjecting three of said group of picture elements to median filtering;

c. producing a correction signal by:
   i. averaging the remaining picture element of said group of picture elements not subject to median filtering with another picture element of said group of picture elements located diametrically with said picture element to be interpolated;
   ii. combining said picture elements which have been subject to median filtering and said picture elements which have been averaged to produce combined picture elements; and
   iii. processing said combined picture elements in accordance with the method of claim 1, said combined picture elements constituting said supplied signal; and d. combining said picture elements which have been subjected to median filtering and said correction signal to produce an interpolated signal.

9. An interpolation filter for a picture signal sampled in accordance with a sampling pattern which is shifted from line to line, said picture signal having picture elements, the interpolation filter comprising:

a. means for identifying a group of four picture elements of said picture signal located around a picture element to be interpolated;

b. a median filter having three inputs for receiving three of said group of picture elements, and an output for supplying a median filter output;

c. a correction circuit comprising:
   i. an averaging circuit having two inputs for receiving the remaining picture element of said group of picture elements not received by said median filter and another picture element of said group of picture elements located diametrically with the picture element to be interpolated, and an output for supplying an averaging circuit output;
   ii. a first combining means for combining said averaging circuit output with said median filter output, said first combining means having an output for supplying a combining means output; and
   iii. processing means for processing said combining means output to produced a correction signal, said processing means including the apparatus as claimed in claim 5 and the output of said first combining means output being said supplied signal; and d. second combining means for combining said median filter output and said correction signal to produce an interpolated signal.

10. A method of interpolating a picture signal sampled in accordance with a sampling pattern which is shifted from line to line, said picture signal having picture elements, the method comprising the steps of:

a. identifying a group of four picture elements of said picture signal located around a picture element to be interpolated;

b. subjecting three of said group of picture elements to median filtering;

c. producing a correction signal by:
   i. averaging the remaining picture element of said group of picture elements not subject to median filtering with another picture element of said group of picture elements located diametrically with said picture element to be interpolated;
   ii. combining said picture elements which have been subjected to median filtering and said picture elements which have been averaged to produce combined picture elements; and iii. processing said combined picture elements in accordance with the method of claim 2, said combined picture elements being said supplied signal; and d. combining said picture elements which have been subject to median filtering and said correction signal to produce an interpolated signal.

11. A method of interpolating a picture signal sampled in accordance with a sampling pattern which is shifted from line to line, said picture signal having picture elements, the method comprising the steps of:

a. identifying a group of four picture elements of said picture signal located around a picture element to be interpolated;

b. subjecting three of said group of picture elements to median filtering;

c. producing a correction signal by:

i. averaging the remaining picture element of said group of picture elements not subjected to median filtering with another picture element of said group of picture elements located diametrically with said picture element to be interpolated;

ii. combining said picture elements which have been subject to median filtering and said picture elements which have been averaged to produce combined picture elements; and iii. processing said combined picture elements in accordance with the method of claim 3, said combined picture elements being said supplied signal; and d. combining said picture elements which have been subject to median filtering and said correction signal to produce an interpolated signal.

12. An interpolation filter for a picture signal sampled in accordance with a sampling pattern which is shifted from line to line, said picture signal having picture elements, the interpolation filter comprising:

a. means for identifying a group of four picture elements of said picture signal located around a picture element to be interpolated;

b. a median filter having three inputs for receiving three of said group of picture elements, and an output for supplying a median filter output;

c. a correction circuit comprising:

i. an averaging circuit having two inputs for receiving the remaining picture element of said group of picture elements not received by said median filter and another picture element of said group of picture elements located diametrically with the picture element to be interpolated, and an output for supplying an averaging circuit output;

ii. a first combining means for combining said averaging circuit output with said median filter output, said first combining means having an output for supplying a combining means output; and iii. processing means for processing said combining means output to produced a correction signal, said processing means including the apparatus as claimed in claim 6 and the output of said combining means being said supplied signal; and d. second combining means for combining said median filter output and said correction signal to produce an interpolated signal.

* * * * *